United States Patent
Lee et al.

(10) Patent No.: US 11,784,605 B2
(45) Date of Patent: Oct. 10, 2023

(54) MOTOR DRIVING APPARATUS

(71) Applicants: Hyundai Motor Company, Seoul (KR); Kia Corporation, Seoul (KR)

(72) Inventors: Yong Jae Lee, Yongin-si (KR); Jang Yoon Jeong, Hwaseong-si (KR); Jae Ho Hwang, Hwaseong-si (KR); Jung Mo Yu, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/889,503

(22) Filed: Aug. 17, 2022

(65) Prior Publication Data
US 2023/0223883 A1 Jul. 13, 2023

(30) Foreign Application Priority Data
Jan. 11, 2022 (KR) .................. 10-2022-0004226

(51) Int. Cl.
*H02P 6/06* (2006.01)
*H02P 27/08* (2006.01)
(Continued)

(52) U.S. Cl.
CPC .......... *H02P 27/08* (2013.01); *H02M 1/0067* (2021.05); *H02M 7/53871* (2013.01); *H02P 21/08* (2013.01); *H02P 21/22* (2016.02)

(58) Field of Classification Search
CPC ...... H02P 29/08; H02P 21/22; H02M 1/0067; H02M 1/08
(Continued)

(56) References Cited

U.S. PATENT DOCUMENTS

2008/0067960 A1* 3/2008 Maeda ................ B62D 5/046
180/443
2009/0033253 A1 2/2009 Nagashima et al.
2017/0294864 A1* 10/2017 Tada ...................... H02P 25/22

FOREIGN PATENT DOCUMENTS

JP 6285256 B2 2/2018
JP 2020-031457 A 2/2020

OTHER PUBLICATIONS

Liu Senyi et al: "Model Predictive Two-Target Current Control for OW-PMSM", IEEE Transactions on Power Electronics, Institute of Electrical and Electronics Engineers, USA, vol. 36, No. 3, Aug. 14, 2020 (Aug. 14, 2020), pp. 3224-3235, XP011817177.
(Continued)

*Primary Examiner* — Erick D Glass
(74) *Attorney, Agent, or Firm* — Morgan, Lewis & Bockius LLP

(57) ABSTRACT

A motor driving apparatus that drives a motor including a plurality of windings respectively corresponding to a plurality of phases, may include a first inverter including a plurality of first switching elements, and connected to a first end of each of the windings; a second inverter including a plurality of second switching elements, and connected to a second end of each of the windings; and a controller including a current controller to produce, based on a predetermined current command of the motor, a voltage command for determining a switching duty of the first switching elements and the second switching elements, wherein the current controller is configured to produce a zero-phase component voltage command among the voltage commands by applying $3^{rd}$ harmonic feedforward compensation.

19 Claims, 8 Drawing Sheets

(51) Int. Cl.
　　　*H02P 21/22*　　　(2016.01)
　　　*H02M 7/5387*　　(2007.01)
　　　*H02M 1/00*　　　(2006.01)
　　　*H02P 21/08*　　　(2016.01)
(58) Field of Classification Search
　　　USPC .................................................. 318/400.02
　　　See application file for complete search history.

(56) References Cited

OTHER PUBLICATIONS

Pairodamonchai Pennapa: "Impact of PWM Modulation Schemes on Common-Mode Voltage Generated by 3-Level Neutral-Point-Clamped Inverters" 2018 Third International Conference on Engineering Science and Innovative Technology (ESIT), IEEE, Apr. 19, 2018 (Apr. 19, 2018), pp. 1-5, XP033530198.

Nian Heng et al: "Investigation and Suppression of Current Zero Crossing Phenomenon for a Semicontrolled Open-Winding PMSG System", IEEE Transactions on Power Electronics, Institute of Electrical and Electronics Engineers, USA, vol. 32, No. 1, Jan. 1, 2017 (Jan. 1, 2017), pp. 602-612, XP011623369.

Reddy B. Prathap et al: "A Fault-Tolerant Multilevel Inverter for Improving the Performance of a Pole-Phase Modulated Nine-Phase Induction Motor Drive", IEEE Transactions on Industrial Electronics, vol. 65, No. 2, Feb. 1, 2018 (Feb. 1, 2018), pp. 1107-1116, XP093043243.

Extended European Search Report dated May 19, 2023, issued in corresponding European Patent Application No. 22191479.9.

\* cited by examiner

[Combined voltage vector]

[First inverter voltage vector]

[Second inverter voltage vector]

MOTOR DRIVING APPARATUS

CROSS-REFERENCE TO RELATED APPLICATION(S)

The present application claims priority to Korean Patent Application No. 10-2022-0004226, filed on Jan. 11, 2022, the entire contents of which is incorporated herein for all purposes by this reference.

BACKGROUND OF THE PRESENT DISCLOSURE

Field of the Present Disclosure

The present disclosure relates to a motor driving apparatus, and more particularly, to, more particularly, to a motor driving apparatus operating based on open-end winding scheme in which inverters are respectively connected to both ends of a winding of the motor.

Description of Related Art

Generally, one end of a winding of each phase included in a motor is connected to an inverter and the other end thereof is connected to each other, and thus a Y-connection is formed.

In the case in which the motor operates, while a switching element in an inverter is turned ON/OFF according to pulse width modulation control, the switching element provides a line voltage to the Y-connected winding of the motor, and produces an alternating current, thereby producing torque.

The fuel efficiency (or the curb weight) of an eco-friendly vehicle such as an electric motor vehicle or the like that utilizes torque produced by such motor as motive power may be determined based on inverter-motor power conversion efficiency. Accordingly, to increase the fuel efficiency, it is important to maximize the power conversion efficiency of an inverter and the efficiency of the motor.

The efficiency of an inverter-motor system is mainly determined based on the voltage utilization rate of an inverter. If the operating point of a vehicle determined by the relationship between a motor speed and torque is present in a section where a voltage utilization rate is high, the fuel efficiency may be improved.

However, when the number of windings of the motor is increased to increase the maximum torque of the motor, the section in which the voltage utilization rate is high may be distant away from a low-torque area which is the main operating point of the vehicle, and thus, the fuel efficiency may be decreased which is a drawback. Furthermore, in terms of fuel efficiency, if it is designed that the section in which the voltage utilization rate is high includes a main operating point, the maximum torque of the motor may be restricted and thus, the acceleration performance of the vehicle may deteriorate, which is a drawback.

To overcome the drawback, the corresponding technical field suggests the motor driving method based on an open end winding (OEW) scheme in which inverters are respectively connected to both ends of a winding of a motor and drive the two inverters, instead of using Y connection so that one end of a wiring wire of the motor is shorted.

Such motor driving method based on the OEW scheme may increase a phase voltage when compared to the method of operating a normal motor including a Y connection structure, so that the voltage utilization rate may be improved and high power is output, which is advantageous.

However, according to the motor driving method based on the OEW scheme, if DC power is applied in common to inverters respectively connected to both the ends of the winding of the motor, a common mode current based on a zero-phase voltage may be produced. While flowing through the winding of the motor, the common mode current may cause a loss, such as a copper loss and iron loss, and may decrease the efficiency of the motor, and in serious cases, a motor system may be damaged.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor driving apparatus that reduces a common mode current between two inverters when driving a motor based on open end winding (OEW) scheme in which inverters are connected respectively to both ends of the winding of the motor, to increase the efficiency of the motor and prevent damage.

In accordance with an aspect of the present disclosure, there is provided a motor driving apparatus configured to drive a motor including a plurality of windings respectively corresponding to a plurality of phases, the motor driving apparatus including a first inverter including a plurality of first switching elements, and connected to a first end of each of the windings, a second inverter including a plurality of second switching elements, and connected to a second end of each of the windings, and a controller including a current controller to produce, based on a predetermined current command of the motor, a voltage command for determining a switching duty of the first switching elements and the second switching elements, wherein the current controller is configured to produce a zero-phase component voltage command among the voltage commands by applying $3^{rd}$ harmonic feedforward compensation.

According to an exemplary embodiment of the present disclosure, the current controller may include a current controller to compare a zero-phase component current command of the motor and a zero-phase component current that flows through the motor, and to produce a zero-phase component voltage value to reduce an error therebetween, a $3^{rd}$ harmonic calculator to determine a $3^{rd}$ harmonic component according to a rotation angle of the motor, a rotation speed of the motor, a magnitude of a zero-phase component magnetic flux of the motor, and a phase of the zero-phase component magnetic flux of the motor, and a summing unit to produce the zero-phase component voltage command by adding the $3^{rd}$ harmonic component to the zero-phase component voltage value to reduce the error.

According to an exemplary embodiment of the present disclosure, the current controller may further include an additional current controller to compare a dq-axes current command of the motor and a dq-axes current that flows through the motor, and to produce a dq-axes voltage command to reduce an error therebetween.

According to an exemplary embodiment of the present disclosure, the current controller may further include a first data map storing in advance a magnitude of a zero-phase component magnetic flux of the motor corresponding to a d-axis current and q-axis current of the motor, and a second data map storing in advance a phase of a zero-phase component magnetic flux of the motor corresponding to a d-axis current and q-axis current of the motor.

According to an exemplary embodiment of the present disclosure, the first data map may receive a d-axis current command and a q-axis current command input among current commands of the motor, and may output, to the $3^{rd}$ harmonic calculator, a magnitude of a zero-phase component magnetic flux of the motor corresponding to the input d-axis current command and q-axis current command.

According to an exemplary embodiment of the present disclosure, the second data map may receive a d-axis current command and a q-axis current command input among current commands of the motor, and may output, to the $3^{rd}$ harmonic calculator, a phase of a zero-phase component magnetic flux of the motor corresponding to the input d-axis current command and q-axis current command.

According to an exemplary embodiment of the present disclosure, the $3^{rd}$ harmonic calculator may determine the $3^{rd}$ harmonic component according to Equation'

$$V_{n,FF}=3*\omega_r*\lambda_{n,amp}*\cos(3\theta+\lambda_{n,phase})'$$

or Equation'

$$V_{n,FF}=3*\omega_r*\lambda_{n,amp}*\sin(3\theta+\lambda_{n,phase})$$

wherein $V_{n,FF}$: the $3^{rd}$ harmonic component, $\omega_r$: a rotation speed of a rotor of the motor, $\theta$: a rotation angle of the motor, $\lambda_{n,phase}$: a magnitude of a zero-phase component magnetic flux of the motor, $\lambda_{n,phase}$: a phase of a zero-phase component magnetic flux of the motor.

According to an exemplary embodiment of the present disclosure, the current controller may be embodied as a proportional resonant controller.

According to an exemplary embodiment of the present disclosure, the current controller may include a current controller to compare a zero-phase component current command of the motor and a zero-phase component current that flows through the motor based on a triple speed synchronous reference frame, and to produce a zero-phase component voltage command to reduce an error therebetween, and an additional current controller to compare a dq-axes current command of the motor and a dq-axes current that flows through the motor, and to produce a dq-axes voltage command to reduce an error therebetween.

According to an exemplary embodiment of the present disclosure, the current controller may include a zero-phase current extractor to extract a zero-phase component current obtained based on a three-phase current in a form of a DC via a triple angle-based rotational transform, a controller to produce, based on a zero-phase component current command of the motor and the zero-phase component current extracted in the form of a DC, a voltage command to reduce an error, and an inverse rotational transform unit to convert a voltage command for reduction of the error into the zero-phase component voltage command in the form of a $3^{rd}$ harmonic via triple angle-based inverse rotational transform.

According to the motor driving apparatus, a common mode current that flows between two inverters applied to open end winding scheme may be suppressed.

The motor driving apparatus may apply $3^{rd}$ harmonic feedforward compensation to reduce a noise of a zero-phase component current which is caused by a $3^{rd}$ harmonic component, and may dramatically reduce a zero-phase component current error (an n-axis current error).

Furthermore, the motor driving apparatus may decrease an error of a d-axis current and may improve an output of a motor, in addition to reduction of the zero-phase component current error.

The motor driving apparatus may reduce a $3^{rd}$ harmonic current ripple, and thus, may reduce a $3^{rd}$ harmonic vibration and noise in the motor or battery of a vehicle, and may reduce occurrence of overcurrent caused by a zero-phase component current of the motor.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
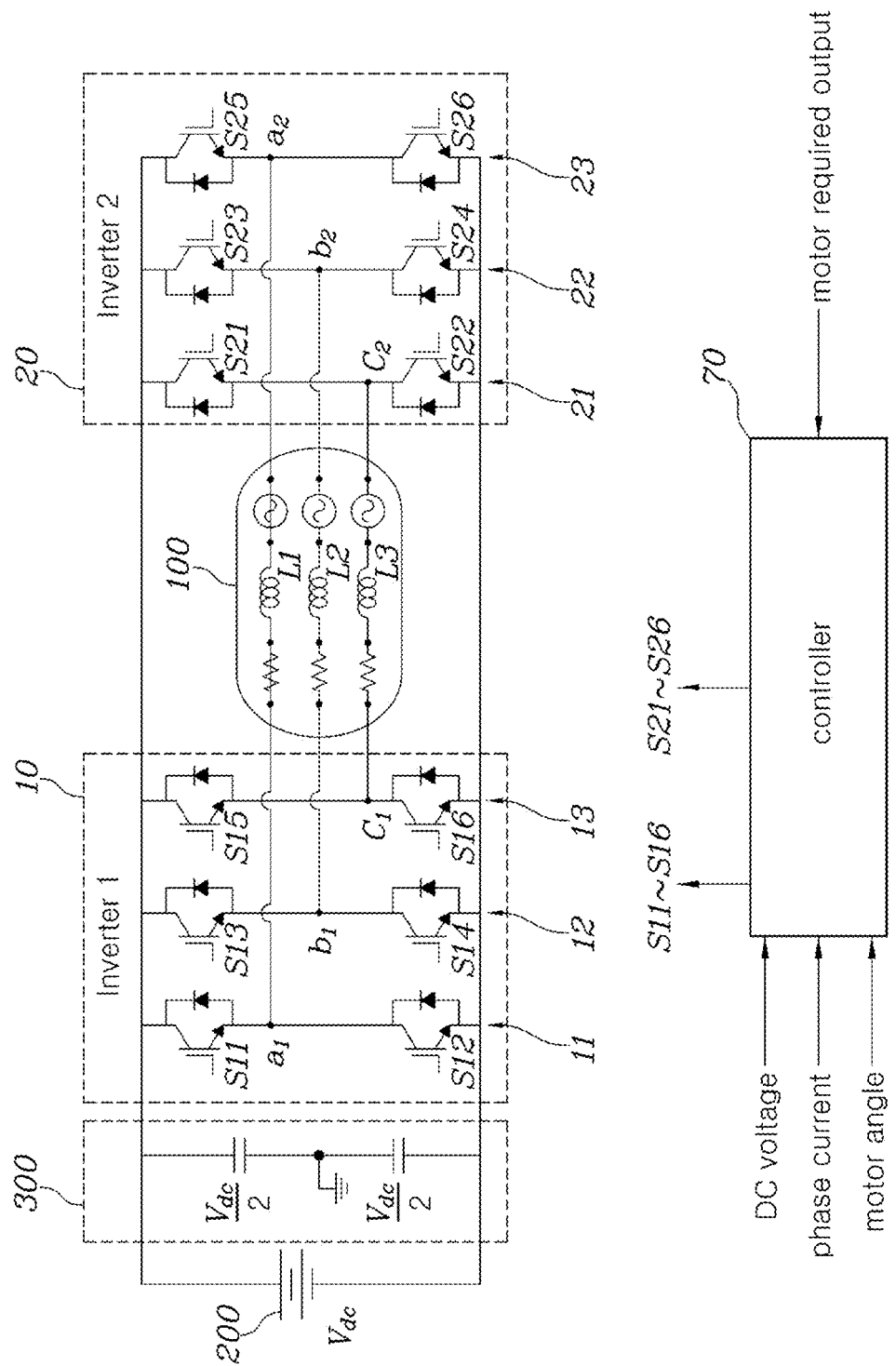
FIG. 1 is a circuit diagram of a motor driving apparatus according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as disclosed herein, including, for example, predetermined dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a motor driving apparatus according to various embodiments of the present disclosure will be described with reference to enclosed drawings.

FIG. 1 is a circuit diagram of a motor driving apparatus according to an exemplary embodiment of the present disclosure.

Referring to FIG. 1, a motor driving apparatus according to an exemplary embodiment of the present disclosure may be a motor driving apparatus that supplies driving power to a motor 100 that includes a plurality of windings L1, L2 and L3 corresponding to a plurality of phases. The motor driving apparatus may include a first inverter 10 including a plurality of first switching elements S11, S12, S13, S14, S15 and S16 and connected to a first end of each winding of the motor 100, a second inverter 20 including a plurality of second switching elements S21, S22, S23, S24, S25 and S26 and connected to a second end of each winding of the motor 100, and a controller 70 that performs, based on a required output of the motor 100, pulse width modulation control on the first switching element S11, S12, S13, S14, S15 and S16 and the second switching elements S21, S22, S23, S24, S25 and S26.

The first inverter 10 and the second inverter 20 may convert DC power stored in a battery 200 into three-phase AC power and provide the same to the motor 100, or may convert regenerative braking energy produced by the occurrence of regenerative braking torque of the motor 100 into a DC and provide the same to the battery 200. The conversion between DC power and AC power may be performed via pulse width modulation control on the plurality of first switching elements S11, S12, S13, S14, S15 and S16 and the plurality of second switching elements S21, S22, S23, S24, S25 and S26, respectively included in the first inverter 10 and the second inverter 20.

The first inverter 10 may include a plurality of legs 11 to 13 to which a DC voltage formed in a DC link capacitor 300 connected between both the ends of the battery 200 is provided. The legs 11 to 13 may respectively correspond to the plurality of phases of the motor 100, and electrical connections may be formed.

The first leg 11 may include two switching elements S11 and S12 that are mutually connected in series between both the ends of the DC capacitor 300, and a connection node of the two switching elements S11 and S12 may be connected to one end of the winding L1 of one of the phases in the motor 100 so that AC power corresponding to one of the plurality of phases is input or output.

In the same manner, the second leg 12 may include two switching elements S13 and S14 that are mutually connected in series between both the ends of the DC capacitor 300, and a connection node of the two switching elements S13 and S14 may be connected to one end of the winding L2 of one of the phases in the motor 100 so that AC power corresponding to one of the plurality of phases is input or output.

Furthermore, the third leg 13 may include two switching elements S15 and S16 that are mutually connected in series between both the ends of the DC capacitor 300, and a connection node of the two switching elements S15 and S16 may be connected to one end of the winding L3 of one of the phases in the motor 100 so that AC power corresponding to one of the plurality of phases is input or output.

The second inverter 20 may also have a configuration similar to that of the first inverter 10. The second inverter 20 may include a plurality of legs 21 to 23 to which a DC voltage formed in the DC link capacitor 300 connected between both the ends of the battery 200 is provided. The legs 21 to 23 may respectively correspond to the plurality of phases of the motor 100, and thus, electrical connections may be formed.

The first leg 21 may include two switching elements S21 and S22 that are mutually connected in series between both the ends of the DC capacitor 300, and a connection node of the two switching elements S21 and S22 may be connected to the other end of the winding L1 of one of the phases in the motor 100 so that AC power corresponding to one of the plurality of phases is input or output.

In the same manner, the second leg 22 may include two switching elements S23 and S24 that are mutually connected in series between both the ends of the DC capacitor 300, and a connection node of the two switching elements S23 and S24 may be connected to the other end of the winding L2 of one of the phases in the motor 100 so that AC power corresponding to one of the plurality of phases is input or output.

Furthermore, the third leg 23 may include two switching elements S25 and S26 that are mutually connected in series between both the ends of the DC capacitor 300, and a connection node of the two switching elements S25 and S26 may be connected to the other end of the winding L3 of one of the phases in the motor 100 so that AC power corresponding to one of the plurality of phases is input or output.

The first inverter 10 may be connected to one ends of the windings L1, L2 and L3 of the motor 100, and the second inverter 20 may be connected to the other ends of the windings L1, L2 and L3. That is, an electrical connection based on an open end winding scheme may be formed in which both the ends of the windings L1, L2 and L3 of the motor 100 may be connected to the first inverter 10 and the second inverter 20, respectively.

The controller 70 may be a factor that performs pulse width modulation control on the switching elements S11, S12, S13, S14, S15 and S16 and S21, S22, S23, S24, S25 and S26 respectively included in the first inverter 10 and the second inverter 20 so that the motor 100 drives based on a required output which is required from the motor 100.

The controller 70 may receive a DC voltage ($V_{dc}$) applied to the first inverter 10 and the second inverter 20, a phase current provided to the motor 100 detected by a current sensor, an electrical angle of a motor detected by a motor rotor sensor provided in the motor 100, and the like, and may perform switching the first switching elements S11, S12, S13, S14, S15 and S16 of the first inverter 10 and the second switching elements S21, S22, S23, S24, S25 and S26 of the second inverter 20 according to a pulse width modulation scheme, to drive the motor 100. When the controller 70 controls the first switching elements S11, S12, S13, S14, S15 and S16 and the second switching element S21, S22, S23, S24, S25 and S26 of the second inverter 20 according to the pulse width modulation scheme, the controller 70 may apply a space vector pulse width modulation (SVPWM) scheme.

To help clear understanding of a motor driving apparatus according to an exemplary embodiment of the present disclosure, configured as described above, a method of controlling a normal motor driving apparatus based on an open end winding scheme will be described first.

Figure 2:
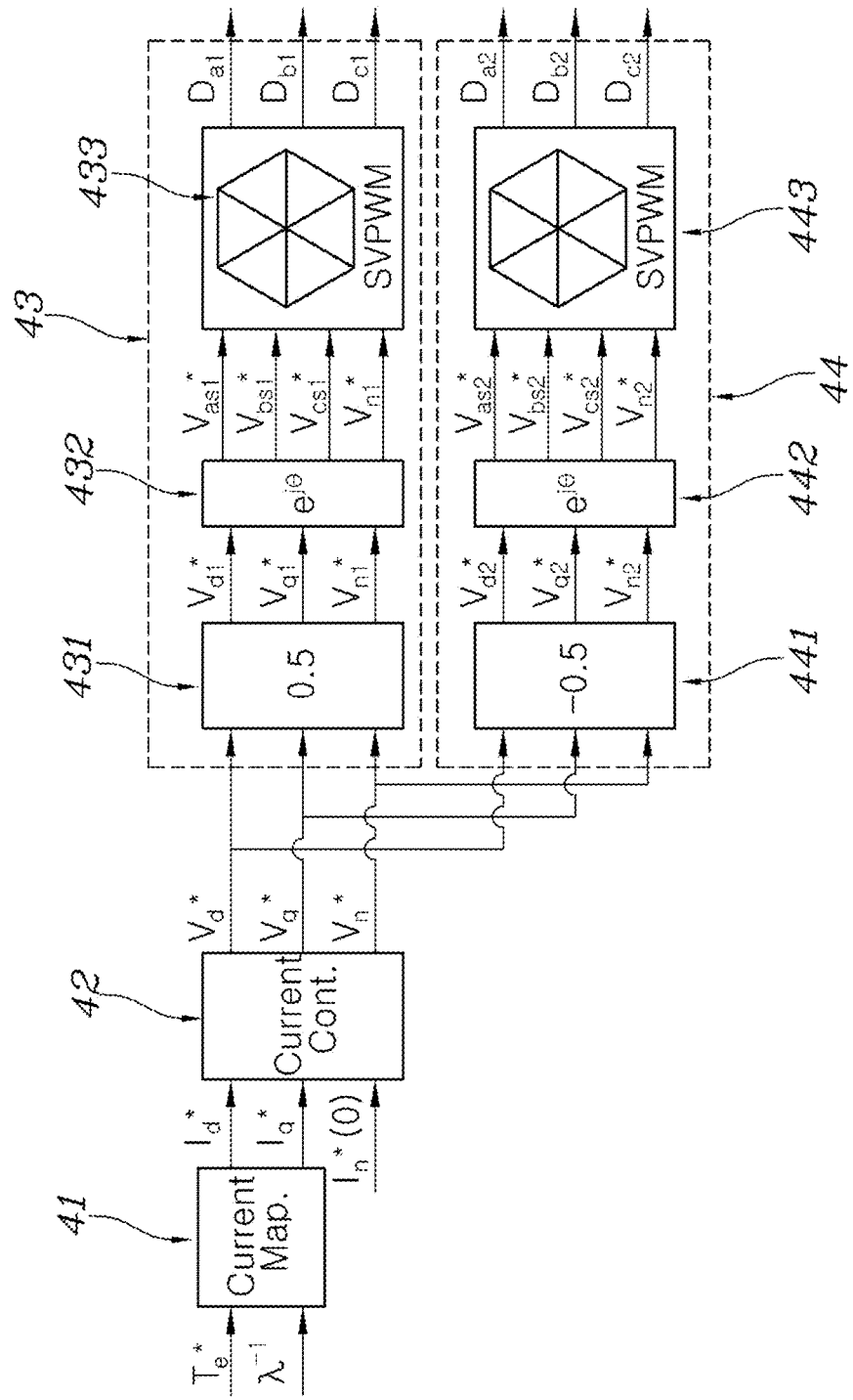
FIG. 2 is a block diagram illustrating a normal controller configured for controlling a motor according to an open end winding scheme.
Figure 3:
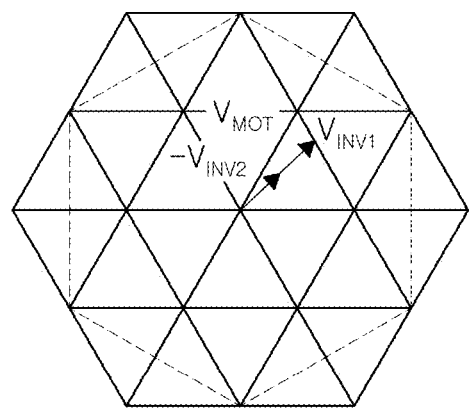
FIG. 3 is a voltage vector diagram illustrating a motor controlling scheme applied to the normal controller illustrated in FIG. 2.
Figure 3:
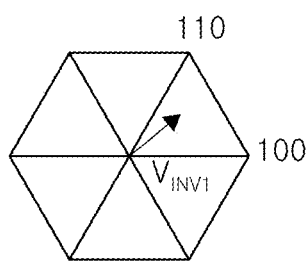
Figure 3:
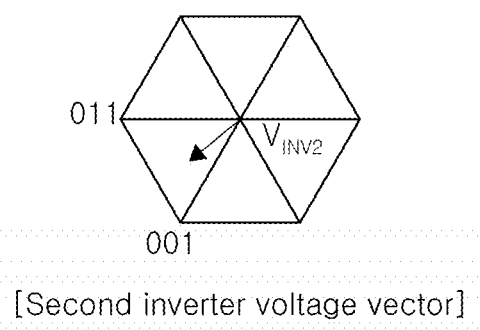
Figure 4:
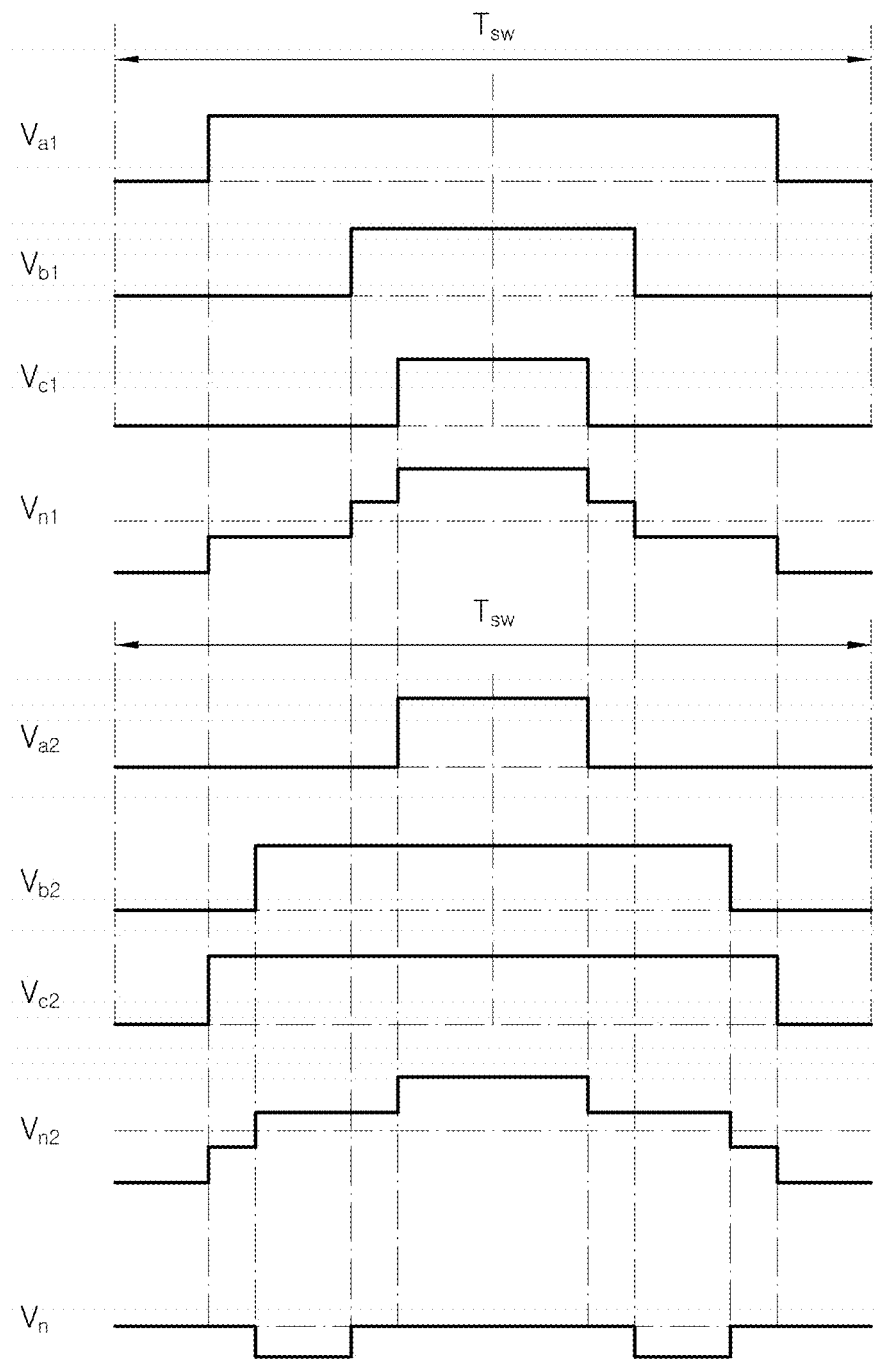
FIG. 4 is a waveform diagram illustrating a voltage output of each inverter produced when a motor is controlled by the normal controller of FIG. 2.

FIG. 2 is a block diagram illustrating a normal controller configured for controlling a motor according to an open end winding scheme in detail, and FIG. 3 is a voltage vector diagram illustrating a motor control method applied to the normal controller illustrated in FIG. 2. Furthermore, FIG. 4 is a waveform diagram illustrating a voltage output of each inverter produced when the conventional controller of FIG. 2 controls a motor.

As illustrated in FIG. 2, the controller of a conventional motor driving apparatus may include a current command map 41, a current controller 42, a first duty producer 43, and a second duty producer 44.

Based on a motor required output (a motor required torque ($T_e^*$)) produced by manipulation by an operator or the like, and counter-electromotive force ($\lambda^{-1}$) of a motor, the current command map 41 may produce a current command ($I_d^*$, $I_q^*$) corresponding thereto. The current command map 41 is to produce a current command of the motor based on the motor required output, and the example of FIG. 2 illustrates a map based on a motor required output and a counter-electromotive force. However, a map to produce a current command of the motor based on other factors may be applied.

The current controller 42 may receive an input current command ($I_d^*$, $I_q^*$, $I_n^*(0)$), wherein $I_n^*(0)$ is a zero-phase component current command, may compare the current command with a value obtained by detecting a current actually provided to the motor, and may produce a voltage command ($V_d^*$, $V_q^*$, $V_n^*$) to reduce a difference therebetween. The voltage command may include a d-axis component ($V_d^*$), a q-axis component ($V_q^*$), and zero-phase component ($V_n^*$).

The first duty producer 43 is an element to produce a duty of a switching element in the first inverter 10 illustrated in FIG. 1, and may include a multiplication unit 431 to produce a first inverter voltage command ($V_{d1}^*$, $V_{q1}^*$, $V_{n1}^*$) by multiplying the voltage command ($V_d^*$, $V_q^*$, $V_n^*$) by ½, and to apply the same to the first inverter 10, a coordinate converter 432 to convert the first inverter voltage command ($V_{d1}^*$, $V_{q1}^*$, $V_{n1}^*$) to a first inverter phase-voltage command ($V_{as1}^*$, $V_{bs1}^*$, $V_{cs1}^*$) corresponding to each phase of the motor, and a first space vector pulse width modulator 433 to perform space vector pulse width modulation based on the first inverter phase-voltage command ($V_{as1}^*$, $V_{bs1}^*$, $V_{cs1}^*$) and a zero-phase component ($V_{n1}^*$) among the first inverter voltage commands, to produce a duty of a switching element in the first inverter 10.

Similar to the first duty producer 43, the second duty producer 44 is an element to produce a duty of a switching element in the second inverter 20 illustrated in FIG. 1, and may include a multiplication unit 441 to produce a second inverter voltage command ($V_{d2}^*$, $V_{q2}^*$, $V_{n2}^*$) by multiplying a voltage command ($V_d^*$, $V_q^*$, $V_n^*$) by −½, and to apply the same to the second inverter 20, a coordinate converter 442 to convert the second inverter voltage command ($V_{d2}^*$, $V_{q2}^*$, $V_{q2}^*$) to a second inverter phase-voltage command ($V_{as2}^*$, $V_{bs2}^*$, $V_{cs2}^*$) corresponding to each phase of the motor, and a second space vector pulse width modulator 443 to perform a space vector pulse width modulation based on the second inverter phase-voltage command ($V_{as2}^*$, $V_{bs2}^*$, $V_{cs2}^*$) and a zero-phase component $V_{n2}^*$ among the second inverter voltage commands, to produce a duty of a switching element in the second inverter 20.

Here, coordinate conversion by the coordinate converters 432 and 442 may be performed according to the conversion method publicly known to the corresponding art field that converts dq coordinates into abc coordinates corresponding to the three phases of a motor.

As illustrated in FIG. 2, the normal open end winding scheme-based motor control method may be performed by equally distributing a voltage command of the motor to a first inverter and a second inverter.

That is, as illustrated in FIG. 3, in the case of controlling a motor including an open end winding structure, a motor voltage ($V_{MOT}$) shown in a vector diagram obtained by combining a switching vector diagram associated with a first inverter and a switching vector diagram associated with a second inverter may be expressed as a difference between a voltage ($V_{INV1}$) by the first inverter and a voltage ($V_{INV2}$) by the second inverter that has the same magnitude of the voltage ($V_{INV1}$) by the first inverter and has the opposite direction. Each vector diagram is shown on the dq plane, and the dq plane, a vector diagram for space vector pulse width modulation, and the like are publicly known to the corresponding art field and thus, detailed description thereof will be omitted.

As described above, in the case in which a first inverter voltage and a second inverter voltage that have the same magnitude and have different directions from each other are embodied via space vector pulse width modulation, an inverter output voltage waveform as shown in FIG. 4 may be obtained. In FIG. 4, $T_{SW}$ denotes a switching period of a switching element in an inverter, $V_{a1}$, $V_{b1}$, $V_{c1}$, and $V_{n1}$ denote respective phase voltages and a zero-phase component voltage of the first inverter, $V_{a2}$, $V_{b2}$, $V_{c2}$, $V_{n2}$ denote respective phase voltages and a zero-phase component voltage of the second inverter, $V_n$ denotes a difference between the zero-phase component voltage of the first inverter and the zero-phase component voltage of the second inverter, and refers to a zero-phase component voltage applied to the motor by the first inverter and the second inverter.

As illustrated in FIG. 4, the first inverter voltage and the second inverter voltage have the same voltage magnitude on the dq plane, but have different phases and thus, they have different zero-phase component voltages. Therefore, the magnitude of the zero-phase component voltage ($V_n$) applied to the motor may not be zero, and thus, a zero-phase component current may be produced.

In the case in which the entire motor driving system is modeled in an open end winding structure that connects the inverters 10 and 20 respectively to both ends of windings L1, L2, and L3 of the motor 100, and drives the motor 100 by performing pulse width modulation control on the inverters 10 and 20, a d-axis voltage, a q-axis voltage, and a zero-phase component voltage may be expressed as shown in Equation 1.

$$\begin{cases} V_d = V_{d1} - V_{d2} = R_s i_d + L_d \dfrac{di_d}{dt} - \omega_r L_q i_q \\ V_q = V_{q1} - V_{q2} = R_s i_q + L_q \dfrac{di_q}{dt} + \omega_r(\lambda_f + L_d i_d) \\ V_n = V_{n1} - V_{n2} = R_s i_n + L_{lk} \dfrac{di_n}{dt} + 3\omega_r \lambda_n \cos 3\theta_r \end{cases} \quad \text{[Equation 1]}$$

I, Equation 1, $V_d$, $V_q$, and $V_n$ denote a d-axis voltage, a q-axis voltage, and a zero-phase component voltage of the entire motor driving system, respectively. $V_{d1}$, $V_{q1}$, and $V_{n1}$ denote a d-axis voltage, a q-axis voltage, and a zero-phase component voltage of the first inverter, respectively. $V_{d2}$, $V_{q2}$, and $V_{n2}$ denote a d-axis voltage, a q-axis voltage, and a zero-phase component voltage of the second inverter, respectively. $i_d$, $i_q$, and $i_n$ denote a d-axis current, a q-axis current, and a zero-phase component current of the motor, respectively. Furthermore, $R_s$ denotes an equivalent resistance of the motor. $L_d$, $L_q$, and $L_{lk}$ denote leakage inductances respectively by a d-axis inductance, a q-axis inductance, and a zero-phase component of the motor. $\lambda_f$ denotes a magnetic flux interlinkage of a stator of the motor. $\lambda_n$ denotes a zero-phase component magnetic flux. $\theta_r$ and $\omega_r$ denote the rotation angle and the angular speed of a rotor of the motor, respectively.

As shown in Equation associated with a zero-phase component voltage ($V_n$) in Equation 1, the zero-phase component voltage may have harmonic in a $3^{rd}$ harmonic form. In the open end winding structure, a zero-phase component current is produced by such zero-phase component voltage, and thus, the zero-phase component current may be in the $3^{rd}$ harmonic form, and may act as a serious noise component.

Therefore, various embodiments of the present disclosure are to provide $3^{rd}$ harmonic feedforward compensation to overcome drawbacks such as motor efficiency deterioration caused by a zero-phase current or the like.

Figure 5:
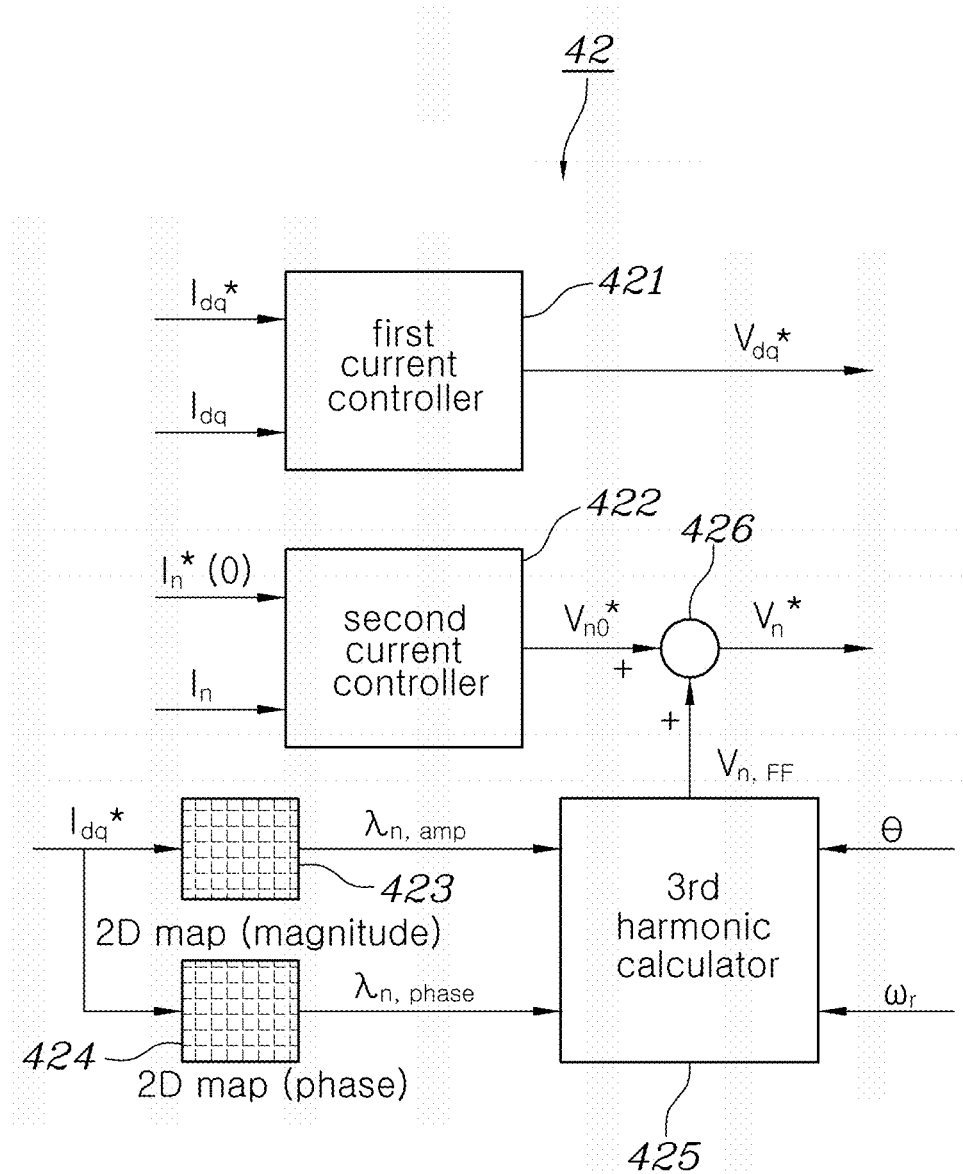
FIG. 5 is a block diagram illustrating the detailed configuration of a current controller applied to a controller applied to a motor driving apparatus according to an exemplary embodiment of the present disclosure.

FIG. 5 is a block diagram illustrating the detailed configuration of a current controller applied to a controller applied to a motor driving apparatus according to an exemplary embodiment of the present disclosure.

The current controller 42 in the controller 70 may include a first current controller 421, a second current controller 422, a first data map 423, a second data map 424, a $3^{rd}$ harmonic calculator 425, and a summing unit 426.

The first current controller 421 may compare a dq-axes current command ($I_{dq}$) determined by the current command map 41 and a dq-axes current ($I_{dq}$) that flows through the motor 100, and may produce a dq-axes voltage command ($V_{dq}$) of the motor to decrease an error therebetween.

The dq-axes current ($I_{dq}$) that flows through the motor 100 may be obtained by converting the value of a current that flows through a winding of each phase of the motor and is detected via a current sensor or the like, into dq coordinates based on the rotation angle ($\theta$) of the motor. The method that converts abc coordinates including the a-axis, the b-axis, and the c-axis respectively corresponding to the phases of the motor into coordinates based on the d-axis and the q-axis (rotational transform (Clarke/Park transformation)) and the method of performing conversion in inverse (inverse rotational transform (Inverse Clarke/Park Transformation)) are publicly known technology in the corresponding art field, and the detailed description thereof will be omitted.

The first current controller 421 may be embodied as one of the various forms such as a proportional-integral (PI) controller, a proportional (P) controller, an integral (I) controller, and the like, and preferably, may be embodied as a PI controller.

The second current controller 422 may compare a zero-phase component current command ($I_n^*$) of the motor and a zero-phase component current ($I_n$) that flows through the motor 100, and may produce a voltage value ($V_{n0}^*$) to reduce an error therebetween.

It is ideal that the zero-phase component current of the motor is 0, and thus, the zero-phase component current command ($I_n^*$) of the motor may be set to 0.

The zero-phase component current ($I_n$) that flows through the motor 100 may be obtained by performing rotational transform on the value of a current that flows through the winding of each phase of the motor and is detected via a current sensor or the like.

The second current controller 422 may be embodied as one of the various forms such as a proportional-integral (PI) controller, a proportional (P) controller, an integral (I) controller, and the like.

The second current controller 422 may be embodied as a proportional resonant (PR) controller which is appropriate for harmonic component compensation.

Based on a rotation angle $\theta$ of the motor, a rotation speed ($\omega_r$) of the motor, a magnitude ($\lambda_{n,amp}$) of the zero-phase component magnetic flux of the motor, and a phase ($\lambda_{n,phase}$) of the zero-phase component magnetic flux of the motor, the $3^{rd}$ harmonic calculator 425 may determine a $3^{rd}$ harmonic component included in a zero-phase component voltage of the motor.

The $3^{rd}$ harmonic calculator 425 may determine a $3^{rd}$ harmonic component as provided in Equation 2 or Equation 3 below, to determine a $3^{rd}$ harmonic component which is present in the zero-phase component voltage in Equation 1.

$$V_{n,FF}=3*\omega_r*\lambda_{n,amp}*\cos(3\theta+\lambda_{n,phase}) \quad \text{[Equation 2]}$$

$$V_{n,FF}=3*\omega_r*\lambda_{n,amp}*\sin(3\theta+\lambda_{n,phase}) \quad \text{[Equation 3]}$$

The summing unit 426 may add the $3^{rd}$ harmonic component determined by the $3^{rd}$ harmonic calculator 425 and an output value ($V_{n0}^*$) of the second current controller 422, and thus, feedforward compensation may be performed. That is, the value determined by the summing unit 426 by adding up the output value ($V_{n0}^*$) of the second current controller 422 and the output value ($V_{n,FF}$) of the $3^{rd}$ harmonic calculator 425 may be a zero-phase component voltage command value ($V_n^*$) used for pulse width modulation control by the motor.

Which of Equation 2 and Equation 3 is to be applied may be determined based on a method that draws the phase ($\lambda_{n,phase}$) of the zero-phase component magnetic flux (i.e., whether the phase is extracted based on a cos function, or the phase is extracted based on a sin function).

The zero-phase component voltage command value ($V_n^*$) to which feedforward compensation is performed may be provided to the duty producers 43 and 44 of FIG. 2, and may be used for producing a duty for pulse width modulation.

The magnitude ($\lambda_{n,amp}$) of the zero-phase component magnetic flux and the phase ($\lambda_{n,phase}$) of the zero-phase component magnetic flux of the motor may be determined based on the data maps 423 and 424. As another example of a current controller, a current controller 42', as illustrated in FIG. 6A, may be embodied in a structure that utilizes a triple speed synchronous reference frame.

Figure 6A:
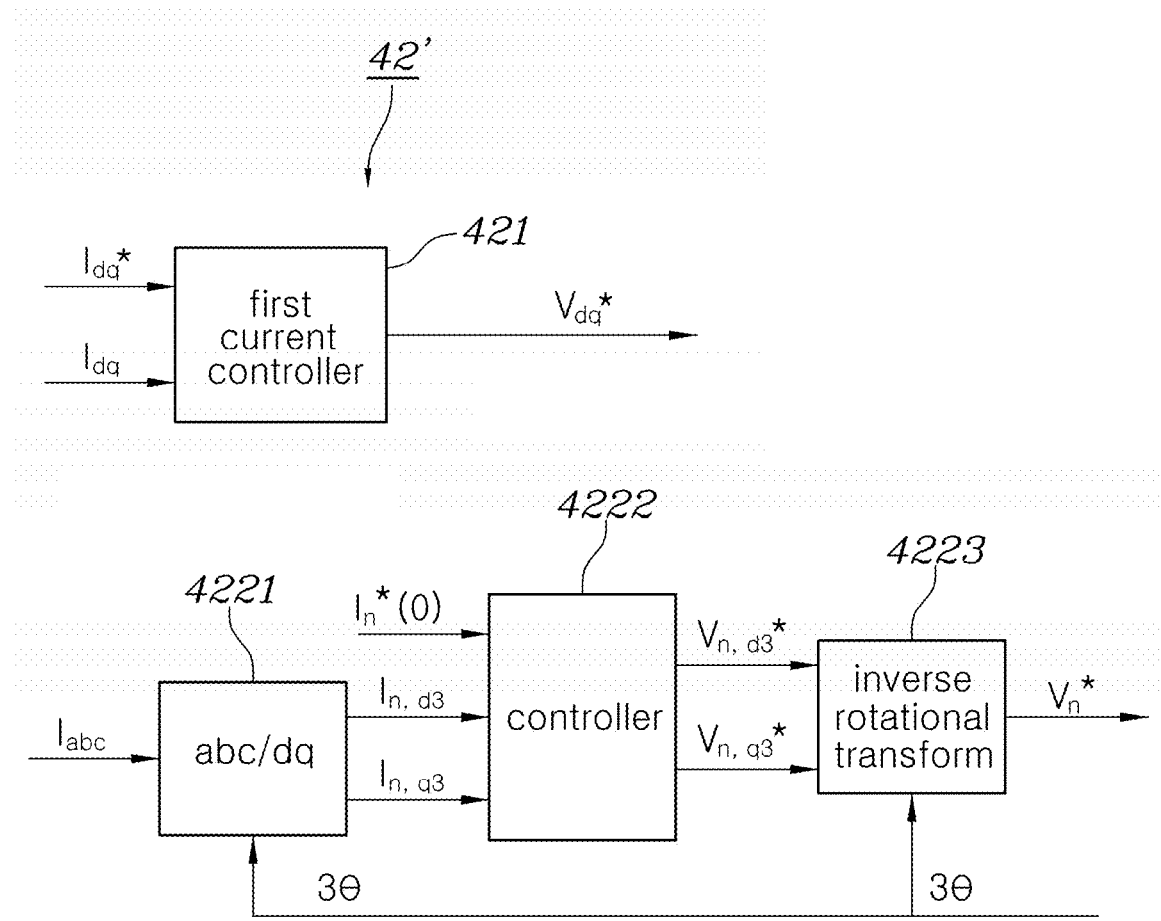
FIG. 6A is a block diagram illustrating the detailed configuration of a controller configured for controlling a zero-phase component current in a current controller applied to a controller applied to a motor driving apparatus according to an exemplary embodiment of the present disclosure.

FIG. 6A is a block diagram illustrating the detailed configuration of a controller configured for controlling a zero-phase component current in a current controller applied to a controller applied to a motor driving apparatus according to an exemplary embodiment of the present disclosure.

In FIG. 6A, even in a current controller structure that utilizes a triple speed synchronous reference frame, the first current controller 421 that compare a dq-axes current command ($I_{dq}^*$) and a dq-axes current ($I_{dq}$) that flows through the motor 100, and produces a dq-axes voltage command ($V_{dq}^*$) of the motor to decrease an error therebetween, may have a configuration similar to that of FIG. 5. Therefore, the description of the first current controller will be omitted, and a second current controller 4221, 4222, and 4223 will be mainly described.

Referring to FIG. 6A, the second current controller may include a zero-phase current extractor 4221 that perform a triple angle-based rotational transform on a zero-phase component current obtained based on a three-phase current ($I_{abc}$), to extract a current ($I_{n,d3}$, $I_{n,q3}$) in a form of a DC, a controller 4222 that compares a zero-phase component current command ($I_n^*(0)$) of the motor and the DC form of a zero-phase component current that flows through the motor 100, and produces a voltage command ($V_{n,d3}^*$, $V_{n,q3}^*$) to reduce an error therebetween, and an inverse rotation transform unit 4223 performs triple angle-based inverse rotational transform on the output value of the controller 4222 again to convert into a voltage command ($V_n^*$) in a $3^{rd}$ harmonic form.

To control the zero-phase component current in the form of a DC, the zero-phase component current may need to be extracted in the form of a DC. In the present instance, the main component of the zero-phase component current is a $3^{rd}$ harmonic and thus, a $3^{rd}$ component needs to be extracted in the form of a DC. To extract an AC component to be in the form of a DC, the exemplary embodiment may use a method of converting a $3^{rd}$ component to be in the form of a DC using all-pass filter (APF). However, this is merely an example, it is apparent to those skilled in the art that the present disclosure is not limited to a predetermined scheme if the scheme is capable of extracting an AC component to be in the form of a DC.

Figure 6B:
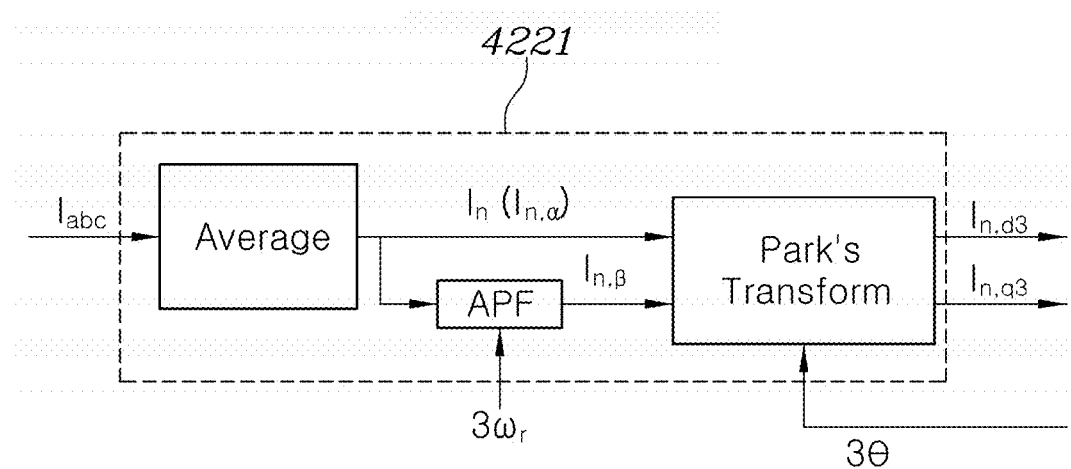
FIG. 6B is a diagram illustrating an example of the configuration of a zero-phase current extractor according to an exemplary embodiment of the present disclosure.

An example of a zero-phase current extractor that utilizes an APF is illustrated in FIG. 6B.

FIG. 6B is a diagram illustrating an example of the configuration of a zero-phase current extractor according to an exemplary embodiment of the present disclosure.

Referring to FIG. 6B, a zero-phase component current ($I_n$) is determined based on the average value of three-phase current ($I_{abc}$), and a signal ($I_{n,\beta}$) having a phase difference of 90 degrees from the original signal ($I_n$) may be produced using an APF having a cutoff frequency of $3\omega_r$. When triple angle-based transform (Park's Transformation) is performed on $I_n$ and $I_{n,\beta}$, zero-phase currents $I_{n,d3}$ and $I_{n,q3}$ in the form of a DC may be obtained.

Referring again to FIG. 6A, the controller 4222 may control a value in the form of a DC and thus, it may be designed using a PI controller. However, this is merely an example, and the present disclosure is not necessarily limited thereto.

A voltage command ($V_n^*$) obtained by the inverse rotational transform unit 4223 by performing triple angle-based inverse rotational transform on a voltage command ($V_{n,d3}^*$, $V_{n,q3}^*$) to be in the form of a $3^{rd}$ harmonic may be output via PWM in the current controller 42', wherein the voltage command ($V_{n,d3}^*$, $V_{n,q3}^*$) has been calculated and output by the controller 4222 for reducing an error.

Hereinafter, the data map 423 and 424 described with reference to FIG. 5 will be described with reference to FIG. 7 and FIG. 8.

Figure 7:
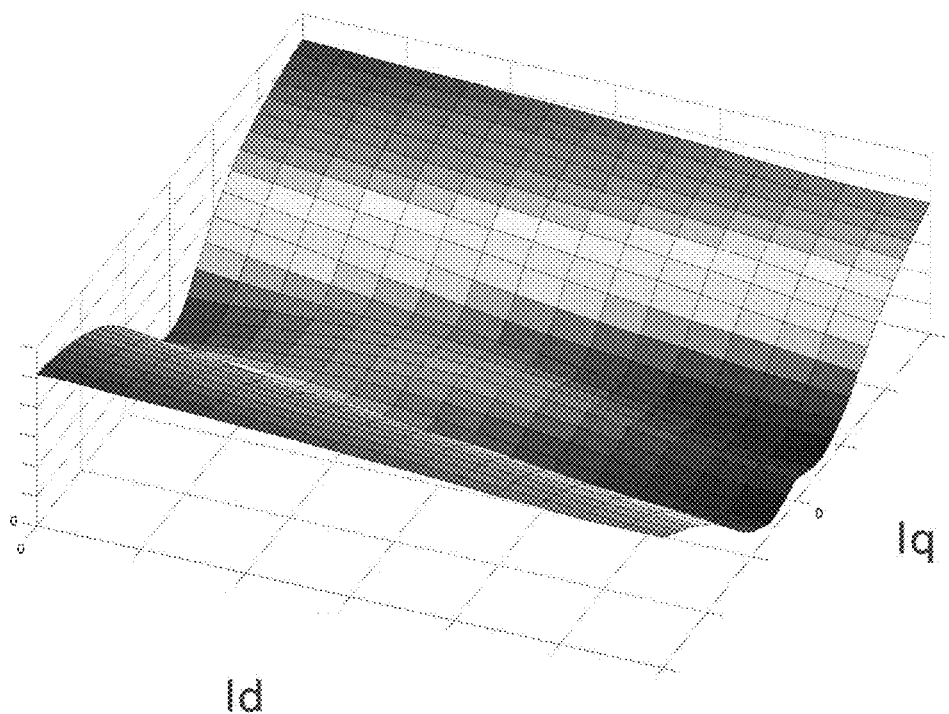
FIG. 7 and FIG. 8 are diagrams illustrating examples of a data map included in a current controller of a controller applied to a motor driving apparatus according to an exemplary embodiment of the present disclosure.
Figure 8:
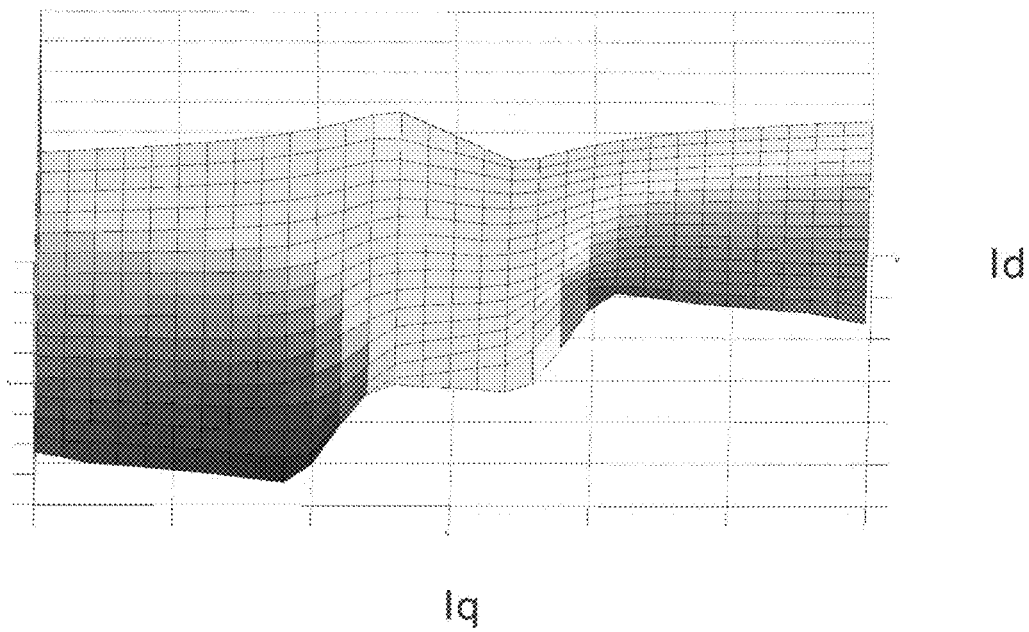

FIG. 7 and FIG. 8 are diagrams illustrating examples of a data map included in a current controller of a controller applied to a motor driving apparatus according to an exemplary embodiment of the present disclosure.

FIG. 7 illustrates a data map for determining the magnitude ($\lambda_{n,amp}$) of a zero-phase component inverse magnetic flux according to a d-axis and q-axis current, and FIG. 8 illustrates a data map for determining the phase ($\lambda_{n,phase}$) of a zero-phase component inverse magnetic flux according to a d-axis and q-axis current.

Here, the value of the z-axis in FIG. 7 denotes a magnitude, and the value of the z-axis in FIG. 8 denotes the axial value of a phase. A density difference may be an auxiliary index for relatively comparing an z value at corresponding (x,y) coordinates.

For reference, in FIG. 7, in the case of the magnitude ($\lambda_{n,amp}$) of the zero-phase component inverse magnetic flux, this is provided in the form which is symmetrical based on the d-axis (an axis corresponding to $I_q=0$). For reference, in FIG. 8, in the case of the phase ($\lambda_{n,phase}$) of the zero-phase component magnetic flux, this is provided in the form which is inverse symmetrical based on the d-axis (an axis corresponding to $I_q=0$). Here, the inverse symmetrical form is symmetrical based on the axis corresponding to $I_q=0$, but in consideration of a plane obtained by cutting at a predetermined $I_d$ value, the plane may be point symmetrical based on $I_q=0$.

This may be expressed by equations as provided below.

Magnitude: $f(x,-y)=f(x,y)$

Phase: $f(x,-y)=2f(x,0)-f(x,y)$

Therefore, it is safe to configure the $3^{rd}$ harmonic magnetic flux and magnitude using only a map associated with a single quadrant in association with the d-axis current and the q-axis current.

Figure 9:
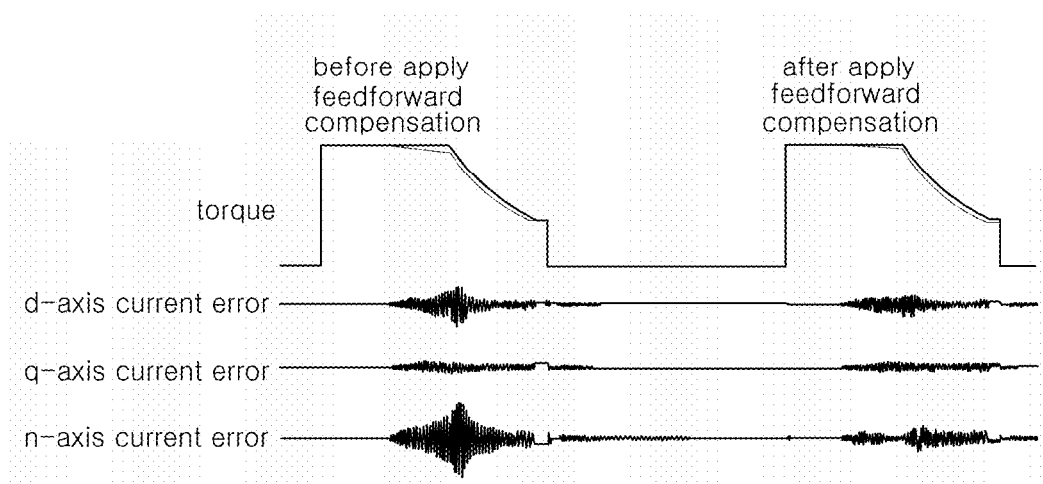
FIG. 9 is a diagram illustrating an improved control performance result obtained when $3^{rd}$ harmonic feedforwarding compensation is applied according to a motor driving apparatus according to an exemplary embodiment of the present disclosure.

FIG. 9 is a diagram illustrating an improved control performance result obtained when a $3^{rd}$ harmonic feedforwarding compensation is applied according to a motor driving apparatus according to an exemplary embodiment of the present disclosure.

As illustrated in FIG. 9, if $3^{rd}$ harmonic feedforward compensation is applied, it is identified that a zero-phase component current error (n-axis current error) is dramatically decreased. This means that $3^{rd}$ harmonic component feedforward compensation may reduce the noise of a zero-phase component current caused by a $3^{rd}$ harmonic component.

Furthermore, it is identified that a d-axis current error is decreased, as well as a zero-phase component current error. It is also identified that torque (output) is partially improved.

That is, the motor driving apparatus according to an exemplary embodiment of the present disclosure can reduce a $3^{rd}$ harmonic current ripple via $3^{rd}$ harmonic feedforward compensation. Accordingly, the $3^{rd}$ harmonic vibration and noise of a motor or battery of a vehicle may be also reduced.

Furthermore, the motor driving apparatus according to an exemplary embodiment of the present disclosure can reduce a current ripple of the motor in terms of control and thus, the occurrence of an overcurrent caused by a zero-phase component current may be reduced.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor driving apparatus configured to drive a motor including a plurality of windings respectively corresponding to a plurality of phases, the motor driving apparatus comprising:
    a first inverter including a plurality of first switching elements, and connected to a first end of each of the windings;
    a second inverter including a plurality of second switching elements, and connected to a second end of each of the windings; and
    a controller including a current controller configured to produce, based on a predetermined current command of the motor, a voltage command for determining a switching duty of the first switching elements and the second switching elements,
    wherein the current controller is further configured to produce a zero-phase component voltage command among the voltage commands by applying $3^{rd}$ harmonic feedforward compensation.

2. The motor driving apparatus of claim 1, wherein the current controller includes:
    a first current controller configured to compare a zero-phase component current command of the motor and a zero-phase component current that flows through the motor, and to produce a zero-phase component voltage value to reduce an error therebetween;
    a $3^{rd}$ harmonic calculator configured to determine a $3^{rd}$ harmonic component according to a rotation angle of the motor, a rotation speed of the motor, a magnitude of a zero-phase component magnetic flux of the motor, and a phase of the zero-phase component magnetic flux of the motor; and
    a summing unit configured to produce the zero-phase component voltage command by adding the $3^{rd}$ harmonic component to the zero-phase component voltage value to reduce the error.

3. The motor driving apparatus of claim 2, wherein the current controller further includes:
    a second current controller configured to compare a dq-axes current command of the motor and a dq-axes current that flows through the motor, and to produce a dq-axes voltage command to reduce an error therebetween.

4. The motor driving apparatus of claim 2, wherein the current controller further includes:
    a first data map storing a predetermined magnitude of a zero-phase component magnetic flux of the motor corresponding to a d-axis current and a q-axis current of the motor; and
    a second data map storing a predetermined phase of the zero-phase component magnetic flux of the motor corresponding to the d-axis current and the q-axis current of the motor.

5. The motor driving apparatus of claim 4, wherein the first data map is configured to output, to the $3^{rd}$ harmonic calculator, a magnitude of a zero-phase component magnetic flux of the motor corresponding to a d-axis current command and a q-axis current command among current commands of the motor.

6. The motor driving apparatus of claim 4, wherein the second data map is configured to output, to the $3^{rd}$ harmonic calculator, a phase of a zero-phase component magnetic flux of the motor corresponding to a d-axis current command and a q-axis current command among current commands of the motor.

7. The motor driving apparatus of claim 2, wherein the $3^{rd}$ harmonic calculator is configured to determine the $3^{rd}$ harmonic component according to:

Equation' $V_{n,FF} = 3 * \omega_r * \lambda_{n,amp} * \cos(3\theta + \lambda_{n,phase})$' or Equation' $V_{n,FF} = 3 * \omega_r * \lambda_{n,amp} * \sin(3\theta + \lambda_{n,phase})$' wherein $V_{n,FF}$ is the $3^{rd}$ harmonic component, $\omega_r$ is the rotation speed of a rotor of the motor, $\theta$ is the rotation angle of the motor, $\lambda_{n,amp}$: is the magnitude of the zero-phase component magnetic flux of the motor, and $\lambda_{n,phase}$ is the phase of the zero-phase component magnetic flux of the motor.

8. The motor driving apparatus of claim 2, wherein the current controller includes a proportional resonant controller.

9. The motor driving apparatus of claim 1, wherein the current controller includes:
a first current controller configured to compare a zero-phase component current command of the motor and a zero-phase component current that flows through the motor based on a triple speed synchronous reference frame, and to produce a zero-phase component voltage command to reduce an error therebetween; and
a second current controller configured to compare a dq-axes current command of the motor and a dq-axes current that flows through the motor, and to produce a dq-axes voltage command to reduce an error therebetween.

10. The motor driving apparatus of claim 9, wherein the first current controller includes:
a zero-phase current extractor configured to extract a zero-phase component current obtained based on a three-phase current in a form of a DC via a triple angle-based rotational transform;
a controller configured to produce, based on a zero-phase component current command of the motor and the zero-phase component current extracted in the form of the DC, a voltage command to reduce an error; and
an inverse rotational transform unit configured to convert the voltage command for reduction of the error into the zero-phase component voltage command in a form of a $3^{rd}$ harmonic via triple angle-based inverse rotational transform.

11. A method of controlling a motor driving apparatus driving a motor including a plurality of windings respectively corresponding to a plurality of phases, the motor driving apparatus including a first inverter including a plurality of first switching elements, and connected to a first end of each of the windings, a second inverter including a plurality of second switching elements, and connected to a second end of each of the windings, the method comprising:
producing, by a current controller of a controller, based on a predetermined current command of the motor, voltage commands for determining a switching duty of the first switching elements and the second switching elements,
wherein the current controller is further configured to produce a zero-phase component voltage command among the voltage commands by applying $3^{rd}$ harmonic feedforward compensation.

12. The method of claim 11, further including:
comparing, by a first current controller of the current controller, a zero-phase component current command of the motor and a zero-phase component current that flows through the motor, and to produce a zero-phase component voltage value to reduce an error therebetween;
determining, by a $3^{rd}$ harmonic calculator of the current controller, a $3^{rd}$ harmonic component according to a rotation angle of the motor, a rotation speed of the motor, a magnitude of a zero-phase component magnetic flux of the motor, and a phase of the zero-phase component magnetic flux of the motor; and producing, by a summing unit of the current controller, the zero-phase component voltage command by adding the $3^{rd}$ harmonic component to the zero-phase component voltage value to reduce the error.

13. The method of claim 12, further including:
comparing, by a second current controller of the current controller, a dq-axes current command of the motor and a dq-axes current that flows through the motor, and producing a dq-axes voltage command to reduce an error therebetween.

14. The method of claim 12, wherein the current controller further includes:
a first data map storing a predetermined magnitude of a zero-phase component magnetic flux of the motor corresponding to a d-axis current and a q-axis current of the motor; and
a second data map storing a predetermined phase of the zero-phase component magnetic flux of the motor corresponding to the d-axis current and the q-axis current of the motor.

15. The method of claim 14, wherein the first data map is configured to output, to the $3^{rd}$ harmonic calculator, a magnitude of a zero-phase component magnetic flux of the motor corresponding to a d-axis current command and a q-axis current command among current commands of the motor.

16. The method of claim 14, wherein the second data map is configured to output, to the $3^{rd}$ harmonic calculator, a phase of a zero-phase component magnetic flux of the motor corresponding to a d-axis current command and a q-axis current command among current commands of the motor.

17. The method of claim 12, wherein the $3^{rd}$ harmonic calculator is configured to determine the $3^{rd}$ harmonic component according to:

Equation'$V_{n,FF}=3*\omega_r*\lambda_{n,amp}*\cos(3\theta+\lambda_{n,phase})$' or Equation'$V_{n,FF}=3*\omega_r*\lambda_{n,amp}*\sin(3\theta+\lambda_{n,phase})$' wherein $V_{n,FF}$ is the $3^{rd}$ harmonic component, $\omega_r$ is the rotation speed of a rotor of the motor, $\theta$ is the rotation angle of the motor, $\lambda_{n,amp}$: is the magnitude of the zero-phase component magnetic flux of the motor, and $\lambda_{n,phase}$ is the phase of the zero-phase component magnetic flux of the motor.

18. The method of claim 11, wherein the current controller includes:
a first current controller configured to compare a zero-phase component current command of the motor and a zero-phase component current that flows through the motor based on a triple speed synchronous reference frame, and to produce a zero-phase component voltage command to reduce an error therebetween; and
a second current controller configured to compare a dq-axes current command of the motor and a dq-axes current that flows through the motor, and to produce a dq-axes voltage command to reduce an error therebetween.

19. The method of claim 18, wherein the first current controller includes:
a zero-phase current extractor configured to extract a zero-phase component current obtained based on a three-phase current in a form of a DC via a triple angle-based rotational transform;
a controller configured to produce, based on a zero-phase component current command of the motor and the zero-phase component current extracted in the form of the DC, a voltage command to reduce an error; and an inverse rotational transform unit configured to convert the voltage command for reduction of the error into the zero-phase component voltage command in a form of a $3^{rd}$ harmonic via triple angle-based inverse rotational transform.

* * * * *